United States Patent [19]
Bodie et al.

[11] Patent Number: 5,913,369
[45] Date of Patent: Jun. 22, 1999

[54] AIR CART MANIFOLD LIFT

[75] Inventors: Cameron D. Bodie; Russell J. Memory, both of Saskatoon, Canada

[73] Assignee: Flexi-Coil Limited, Saskatoon, Canada

[21] Appl. No.: 08/972,238

[22] Filed: Nov. 18, 1997

[51] Int. Cl.$^6$ .............................. A01C 7/18; A01B 73/04
[52] U.S. Cl. .......................... 172/311; 172/452; 111/174
[58] Field of Search .................................. 172/1, 452, 311, 172/456; 111/174, 179, 180, 181, 185, 186, 901

[56] References Cited

U.S. PATENT DOCUMENTS

| | | | |
|---|---|---|---|
| 3,692,121 | 9/1972 | Kenney | 172/456 |
| 4,136,743 | 1/1979 | van der Lely | 172/311 X |
| 4,316,511 | 2/1982 | Andersen | 172/456 X |
| 4,660,654 | 4/1987 | Wiebe et al. | 172/456 X |
| 4,843,983 | 7/1989 | Olson | 111/174 |

FOREIGN PATENT DOCUMENTS

1293890  1/1991  Canada.

*Primary Examiner*—Thomas B. Will
*Assistant Examiner*—Robert Pezzuto
*Attorney, Agent, or Firm*—Neil Teitelbaum & Associates

[57] ABSTRACT

The present invention relates to an automatic lift mechanism for a manifold in a pneumatic delivery system of an agricultural air cart for seed and fertilizer delivery. The unitary manifold is composed of a plurality of pneumatic passages and mixing valves for conducting metered product from to delivery tubes in a delivery tool. The lift mechanism includes a hydraulic cylinder for rotating a pivotal support rod and pivotal linkages connected to the manifold to lower and disengage the manifold from the meters and to position it to one side of the cart in a service position exposing the under carriage for access. A guide is provided to cooperate with the cylinder and pivotal linkages to guide substantially vertical movement of the manifold for disengaging and engaging the meters for sealing contact. The lift mechanism further includes a lock for maintaining the manifold in sealing contact in an operational position under tension once the actuating cylinder is depressurized. Advantageously the present invention provides an automated single operation to position a manifold, replacing manual systems which are more awkward and difficult to operate.

20 Claims, 9 Drawing Sheets

AIR CART MANIFOLD LIFT

FIELD OF THE INVENTION

The present invention relates to a pneumatic conveying system for use in agricultural air cart delivery implements, particularly to a mechanism for providing an automated single operation to disconnect and move the manifold of the pneumatic system to permit access to the meters and tank outlets, or for maintenance.

BACKGROUND OF THE INVENTION

An air cart is an agricultural pneumatic conveying implement which includes a system for blending of air and particulate material, such as seed or fertilizer, for entrainment into an air stream for conveyance to one or more distribution channels. Certain air carts, such as found on the Flexi-coil 20, 30 and 50 Series Models, combine air and particulate material in a manifold structure connected to a meter and numerous associated hoses or conveying tubes. A controlled output rate is achieved by metering directly into separate air flow tubes. In the manifold two or more products may be mixed for simultaneous delivery or maintained in separate streams. The air cart manifold provides more accurate metering to the delivery conduits of the delivery tool for consistent product application rates across the delivery tool. In contrast, other air carts have only a single delivery tube from which product is divided through a dividing header into multiple delivery tubes in the delivery tool. Using a series of dividing headers to separate the product stream repeatedly shocks the product, particularly seed, and the dividing process is more random resulting in less even product distribution.

An air cart can have a number of different product tanks with separate meters and manifold tubes. For each meter a series of tubes is provided in the manifold to carry air and product to delivery tubes of the delivery tool. Within the manifold, communication valves permit mixing product between tubes. It is periodically necessary to remove the manifold for access to the metering wheels for conducting adjustments, rate calibration and meter wheel changes. Conveniently, the manifold is constructed as a unitary assembly which can be positioned with a single connect or disconnect operation to avoid numerous tedious individual connections. The manifold connection for distribution of the particulate carrying air streams through a number of distribution channels is necessarily substantially air tight.

Since the meter area, including the tank outlets of the air cart, is essentially blocked by the manifold, additional problems are encountered removing excess particulate material after use to empty the tanks. Conventional air carts unduly raise the height of the air cart in order to provide clearance under the cart for access of an auger hopper to catch and convey material emptied from the tank. Raising the cart height raises its center of gravity and increases the possibility of overturn operating in uneven terrain. Further, conventional carts allow the emptied material to fall by gravity over the conveyance tubes or hoses of the manifold. This is an untidy process which is inconvenient and results in some product loss.

Smaller air carts with one or two tanks and meters, such as Flexicoil 20 Series and 30 Series, have manual handling mechanisms to lower the manifold for access. In one design a sling and winch are provided to lower the manifold. This provides access to the meters, but is cumbersome for calibration and unloading. Calibration involves collecting and weighing a volume of seed or other material metered from a defined number of rotations into a bag which must rest on the lowered manifold. With the manifold suspended from the cart, it is awkward and difficult to position the collection bags. Tanks must also be unloaded after use by allowing the material to spill over the manifold, and some product will be deflected and lost. The manifold in the lowered position in the sling provides only limited access for a small collection hopper.

An alternative prior design provides a hand crank mechanism for manually lowering the manifold. The manifold is further supported by rollers on a frame which permit the manifold to be rolled in tracks longitudinally or transversely. The manifold can also be rotated about the central supporting crank screw. This range of movement allows the manifold to be shifted from the area or meter where access is needed. The manifold is raised again into position by the hand crank. This design provides more access than the sling design, but it is not possible to shift the manifold completely from the underside to provide access. The roller carriage is a permanent obstruction which causes some difficulty for maintenance. It also requires significant effort to lower and raise the manifold manually. A single point connection like the crank screw does not work well for a large manifold like the three meter design. Flexure across the manifold would make sealing contact difficult at the extreme ends. A two point connection would be needed for reliable action adding more obstructing structure to the undercarriage.

Particularly for a large air cart with three or more tanks and associated meters, the manifold is quite large and heavy. A tier of channels is provided for each meter in the manifold with communication valves between them for mixing any combination of the products. In place in operational position, the manifold obstructs access to the meters for set up, calibration or maintenance. The manifold is particularly heavy for manual handling. In addition the central pivot and rolling bearings of the prior art mechanism would not fully expose a central meter to change meter wheels or calibrate flow.

An automated mechanism is desired to lower the manifold to a service position which provides clear access for maintenance, calibration and unloading to the meters and air cart under carriage, and to accurately and automatically replace it in operational position for full sealing contact at each of the manifold inputs, which would eliminate heavy manual positioning.

SUMMARY OF THE INVENTION

Accordingly, the present invention comprises an automated lift for use in a pneumatic system of an air cart for moving a manifold between an operational position and a service position comprising:

actuator means for effecting displacement between the manifold and the air cart; and, pivotal support means for securing the manifold to the air cart for pivotal movement controlled by the actuator means for raising and lowering the manifold to engage and disengage sealing contact with the pneumatic system, the pivotal support means including a first pivotal linkage and a second pivotal linkage to support the manifold in a substantially horizontal position for engaging and disengaging the manifold to the pneumatic system, the second pivotal linkage including a stop means for limiting relative pivotal movement, whereby further rotation of the first pivotal linkage by the actuator means is adapted to shift the position of the manifold laterally.

A preferred embodiment of the present invention further includes pivotal support means having a first pivotal linkage and a second pivotal linkage to support the manifold in a substantially horizontal position for engaging and disengaging the manifold to the pneumatic system.

In a still further preferred embodiment the second pivotal linkage includes a stop means for limiting relative pivotal movement, whereby further rotation of the first pivotal linkage by the actuator means is adapted to shift the position of the manifold laterally.

A preferred embodiment further includes guide means cooperating with actuator means to direct movement of the manifold for engaging and disengaging the manifold to the pneumatic system.

A preferred embodiment further includes automated locking means for maintaining the manifold in an operational position.

A further preferred embodiment provides a pneumatic system in an air cart for delivering material entrained in a pressurized air stream from at least one meter to a delivery tool comprising:

a manifold comprising a unitary assembly of conduits having an input for sealing contact with a meter and an output for sealing contact to a delivery tool connecting means;

pivotal support means for securing the manifold to the air cart in a first operational position and in a second service position;

actuator means for pivotally moving the manifold between the operational position and the service position.

It is an advantage of the present invention, that the manifold can be disconnected and pivoted to a service position clear of the meter areas by a single automated operation. Further, replacement to an operational position and reconnection is re-established by a single automated return operation.

Further advantages will be apparent to persons of skill in the art from the following detailed description of preferred embodiments, by way of example only, and with reference to the following drawings in which:

DETAILED DESCRIPTION OF PREFERRED EMBODIMENTS

Figure 1:
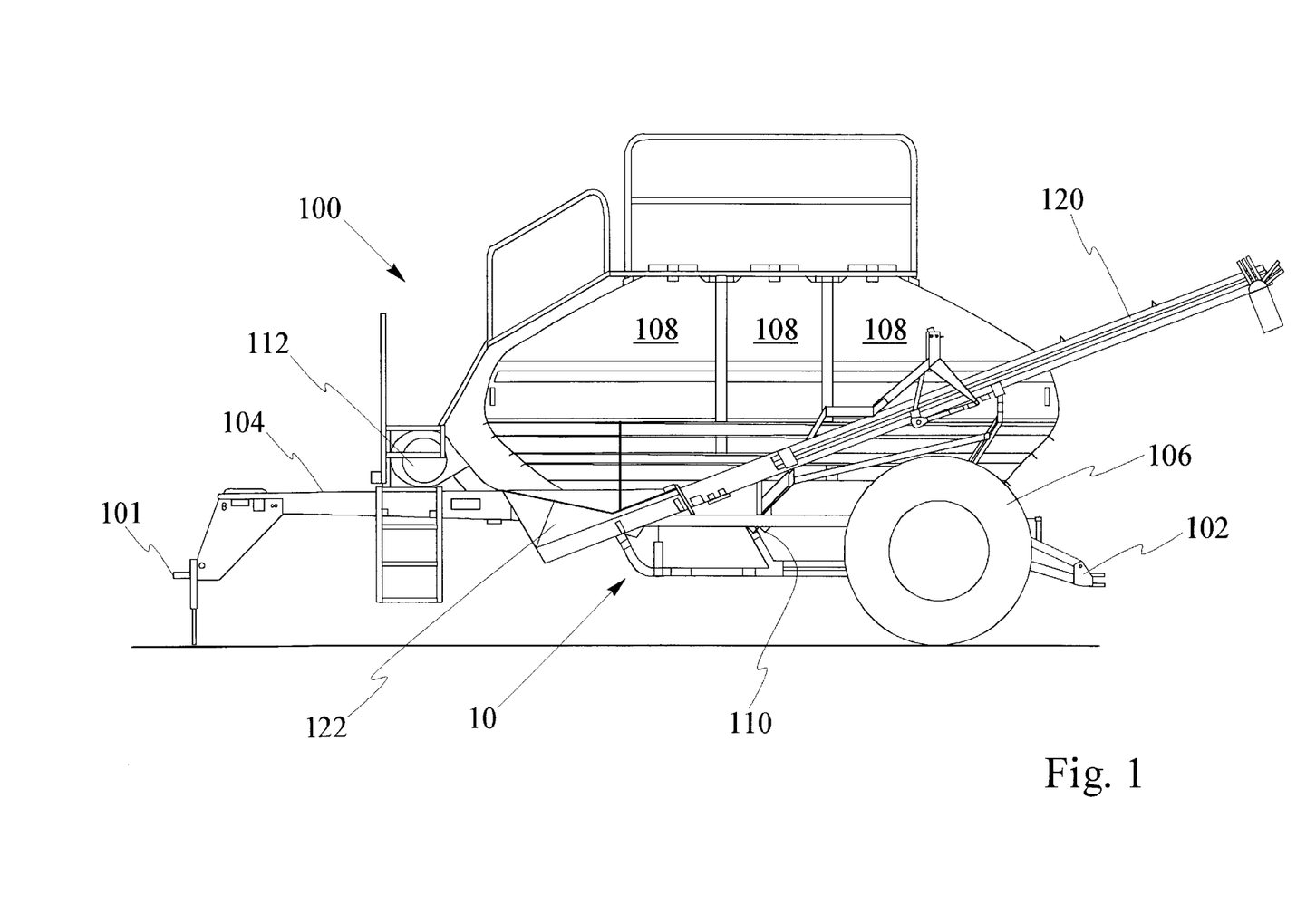
FIG. 1 is a side view of an air cart to which this invention pertains.

An air cart 100 as seen in FIG. 1 is trailed behind a tractor by the hitch 101 either between the tractor and seeding or delivery tool, connected by towing and connection link 102, as illustrated, or behind the delivery tool. The cart 100 is supported on frame 104 on one or more pairs of ground engaging wheels 106. The cart 100 includes one or more material tanks 108, three are illustrated, for transporting and dispensing granular product such as seed, fertilizer, or herbicide. Each tank 108 is associated with a dispensing meter 110 for measuring an accurate amount of product corresponding to the rate of travel to apply a controlled rate of product through the distributing implement to the soil. Product from the meter 110 is dispensed into a moving air stream from the fan 112 and conducted through an array of closed tubing channels, referred to collectively as the manifold 10, to a plurality of distribution hoses in the delivery tool. An auger 120 and hopper 122 are shown with this air cart 100 for loading and unloading the tanks 108. Tanks 108 are unloaded into the hopper 122 by gravity, but the product must bypass the meters 110 and the manifold 10.

Figure 2:
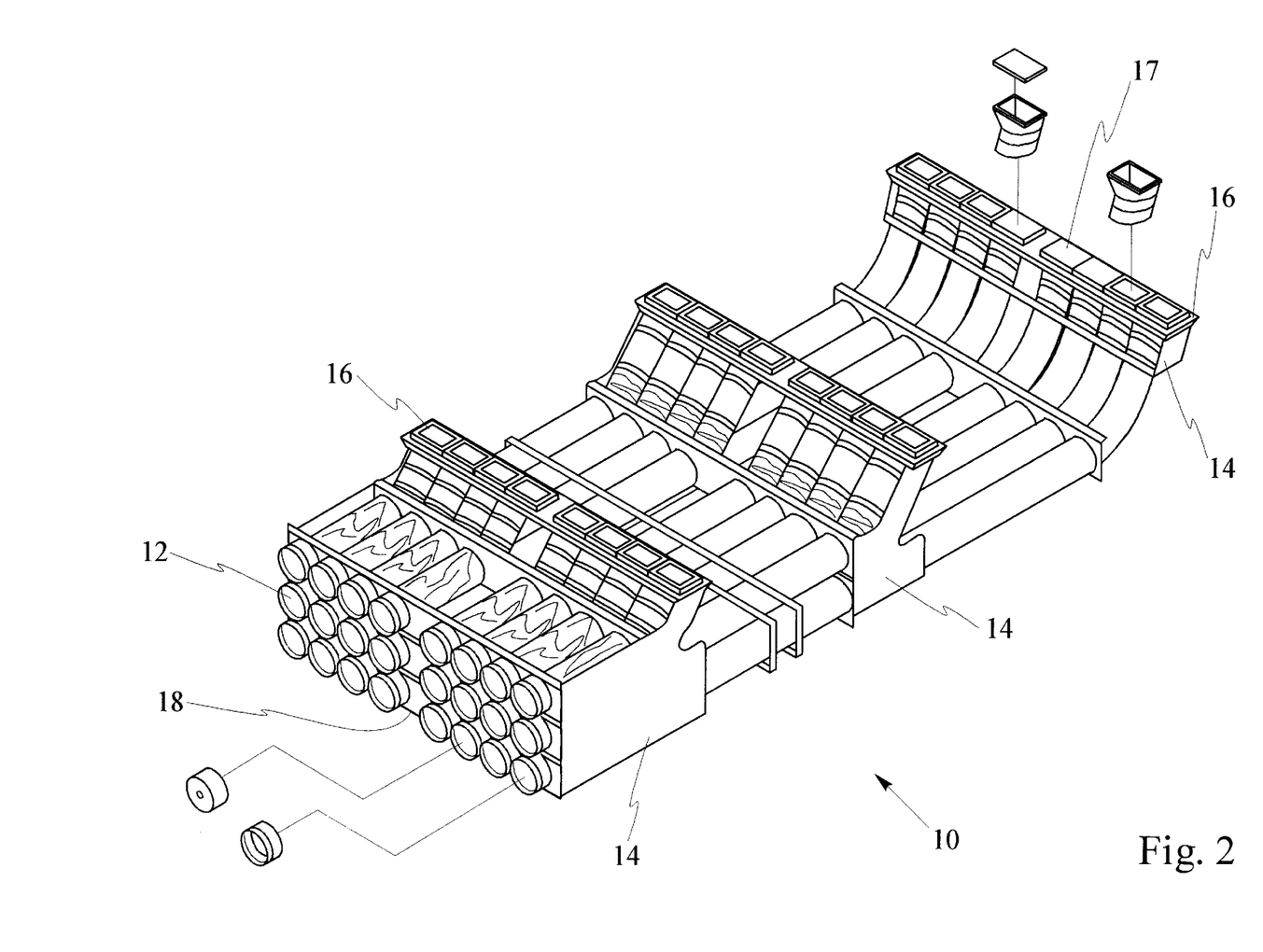
FIG. 2 is an isometric view of a manifold in isolation.
Figure 2A:
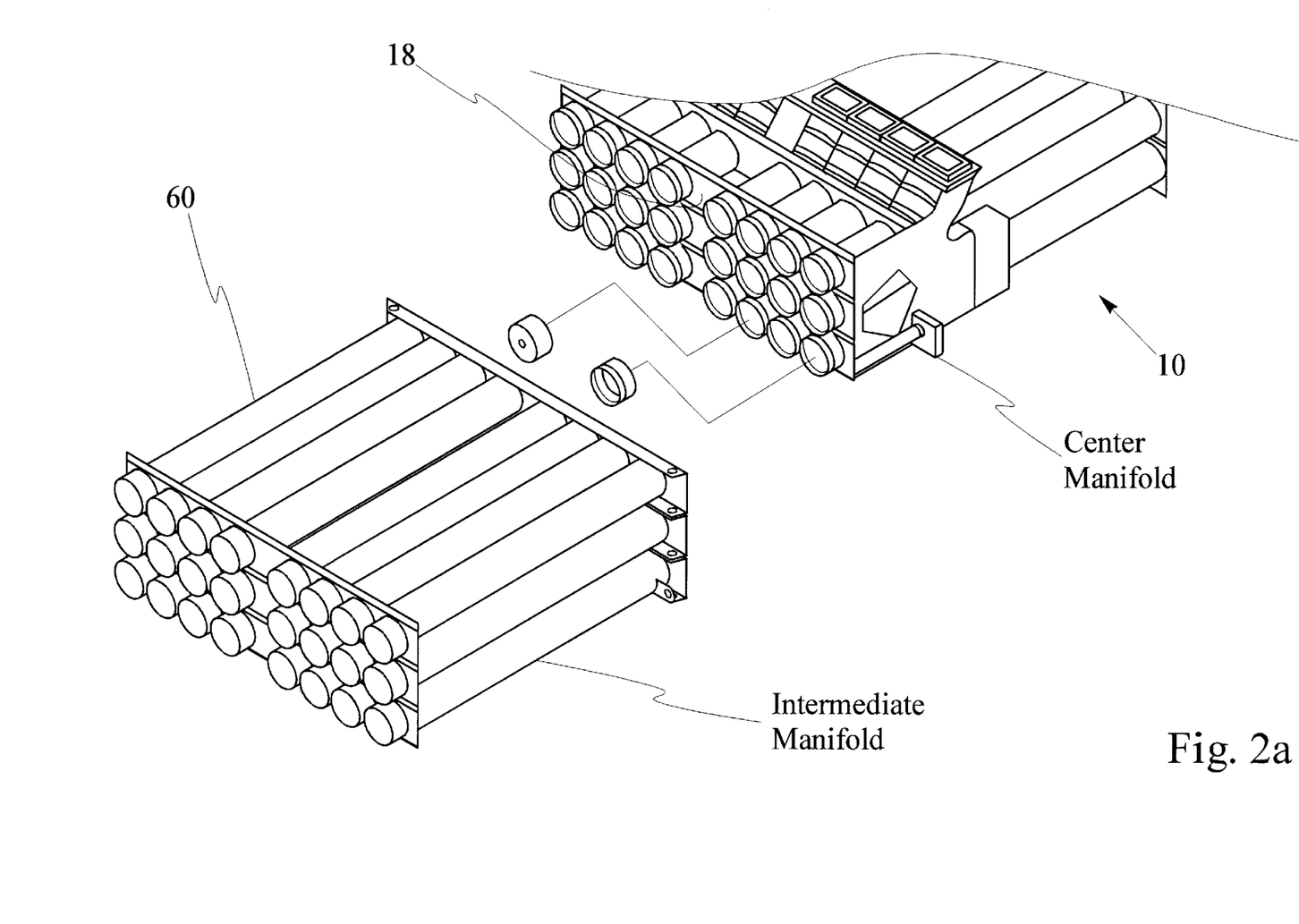
FIG. 2A is an isometric view of an intermediate manifold separated from a discharge end of the manifold (on drawing sheet 7 with FIG. 8)

The manifold 10, shown in FIG. 2, comprises a unitary assembly of tubes 12 arranged in parallel to receive material dispensed by the meters 110. The tubes 12 are arranged in tiers corresponding to each tank meter 110. At the connection points 14, communicating passages with valves are incorporated to permit selected streams of product to be blended for simultaneous delivery, or to maintain the streams in their separate tubes 12. A contact surface 16 is shaped to meet with the meters outlets to form a substantially air tight connection at the manifold inputs 17. An intermediate manifold 60 (seen in FIG. 2A) is moveable horizontally to provide an air tight connection at the discharge end 18 of the manifold 10.

The manifold 10, particularly for a large three tank air cart 100 is quite large and heavy. In its operational position arranged substantially horizontally below the tanks 108 on the frame 104, the manifold 10 blocks access to the meters 110 and drain panels and lowers the clearance beneath the frame. For a number of operations the manifold must be removed from its operational position to a service position to permit access. In the service position the manifold 10 is pivoted and lowered to a position to the side of the cart 100 exposing substantially all of the undercarriage at once. Depending on the product to be dispensed the meters 110 need to be changed to finer or coarser rotors, and the spacing between rotors determined by the number of rows and row spacing to be placed by the distributing implement. Each product dispensed also varies in metering rate depending on its granularity and other factors. Accordingly, prior to operation a calibration for each different material must be conducted. This involves collecting a volume of metered material for a given number of rotations and weighing it. Unloading also demands access to the drain panel bypassing the meter at the lower end of the tanks 108. Further sufficient clearance access for a collection hopper 122 accelerates the process and reduces loss of material. For these routine operations as well as maintenance, it is necessary to shift the manifold 10 out of operational position to a service position exposing the meters and cart undercarriage.

Figure 3:
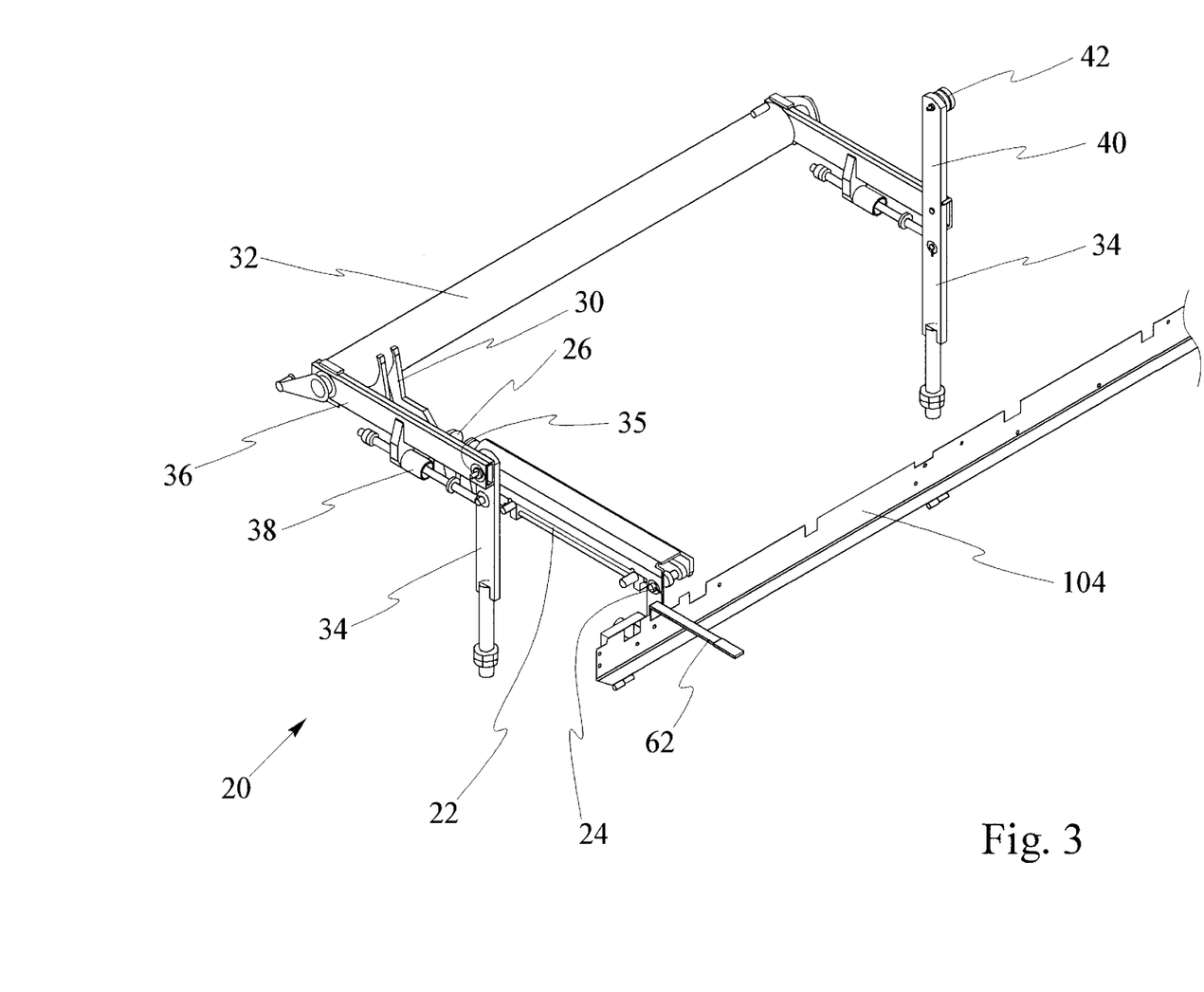
FIG. 3 is an isometric view of the lift linkage members of an exemplary embodiment of the present invention in isolation in an operational position.
Figure 4:
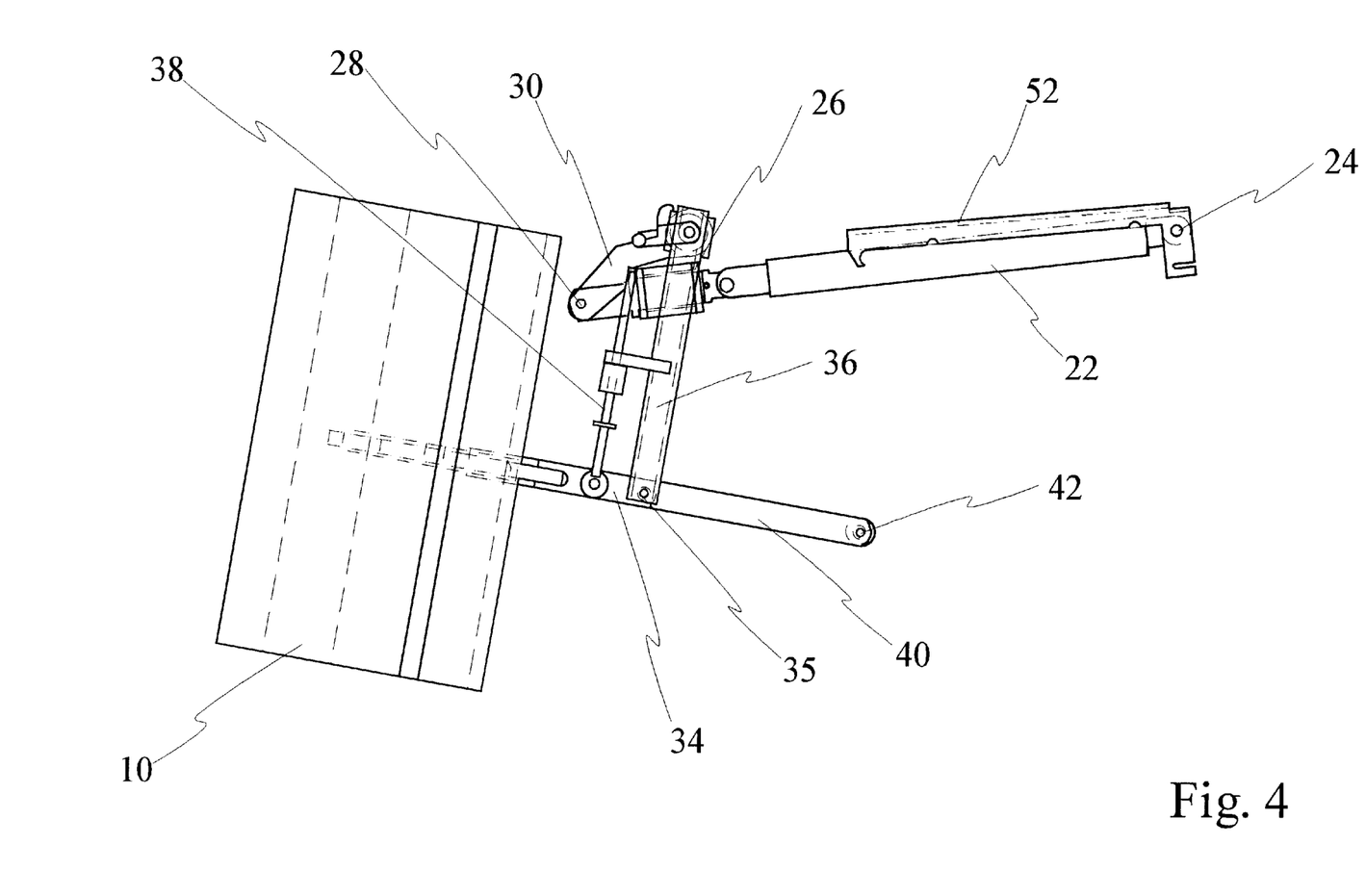
FIG. 4 is an end view of the lift mechanism of FIG. 3 in a service position.
Figure 5:
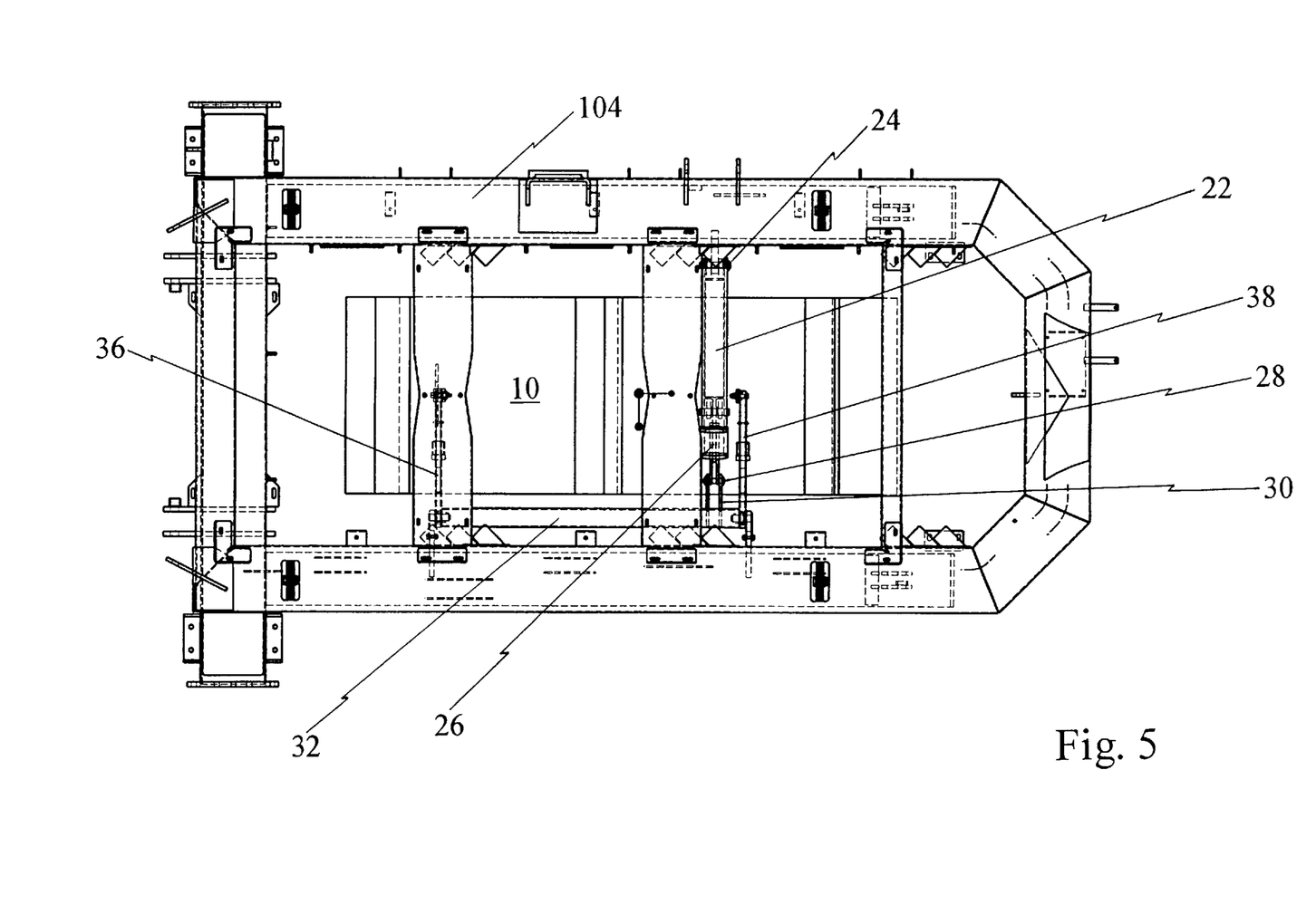
FIG. 5 is a plan view of an air cart frame illustrating the manifold lift linkage, and the manifold in an operational position.

The lift mechanism 20, seen in isolation in FIGS. 3 and 4, provides an automated mechanism for disengaging the contact surface 16 of the manifold 10 from the air cart 100 at the meter outlets, and pivotally lowering the manifold 10 partially to the side of the cart 100 to a service position leaving the undercarriage fully exposed. The lift mechanism 20 includes a hydraulic cylinder 22 pivotally mounted by a pin 24 to the frame 104. At an opposite end the cylinder 22 includes a spring assembly 26 and a pivotal link 28 to a linkage arm 30. Linkage arm 30 is a lever secured to pivotally mounted supporting rod 32. Extension of the cylinder 22 acts on the arm 30 to rotate the supporting rod 32. A pair of lift arms 36 are secured to and rotate with support rod 32. The manifold 10 is secured to the lift mechanism 20 by a pair of lift straps 34 mounted to the manifold 10 at a center of balance pivotally connected at 35 to the opposite end of the pair of lift arms 36. Two axes of rotation, a first through pivotal support rod 32 and a second at the pivotal connection 35 between lift arms 36 and lift straps 34 permit the manifold 10 to be lowered in a substantially horizontal orientation suspended from the lift straps 34. Control rods 38 secured between lift straps 34 and lift arms 36 limit the pivotal movement at connection 35. As a result, when the full extension of the control rods 38 is reached, further extension of the cylinder 22 moves the manifold 10 about the axis of the support rod 32. Advantageously this shifts the manifold 10 laterally from directly beneath the cart 100. The control rods 38 include springs to minimize the shock as the lift straps 34 reach a fully extended position. A stop mechanism such as a simple abutment could also be used to limit the relative movement, without springs.

Figure 6:
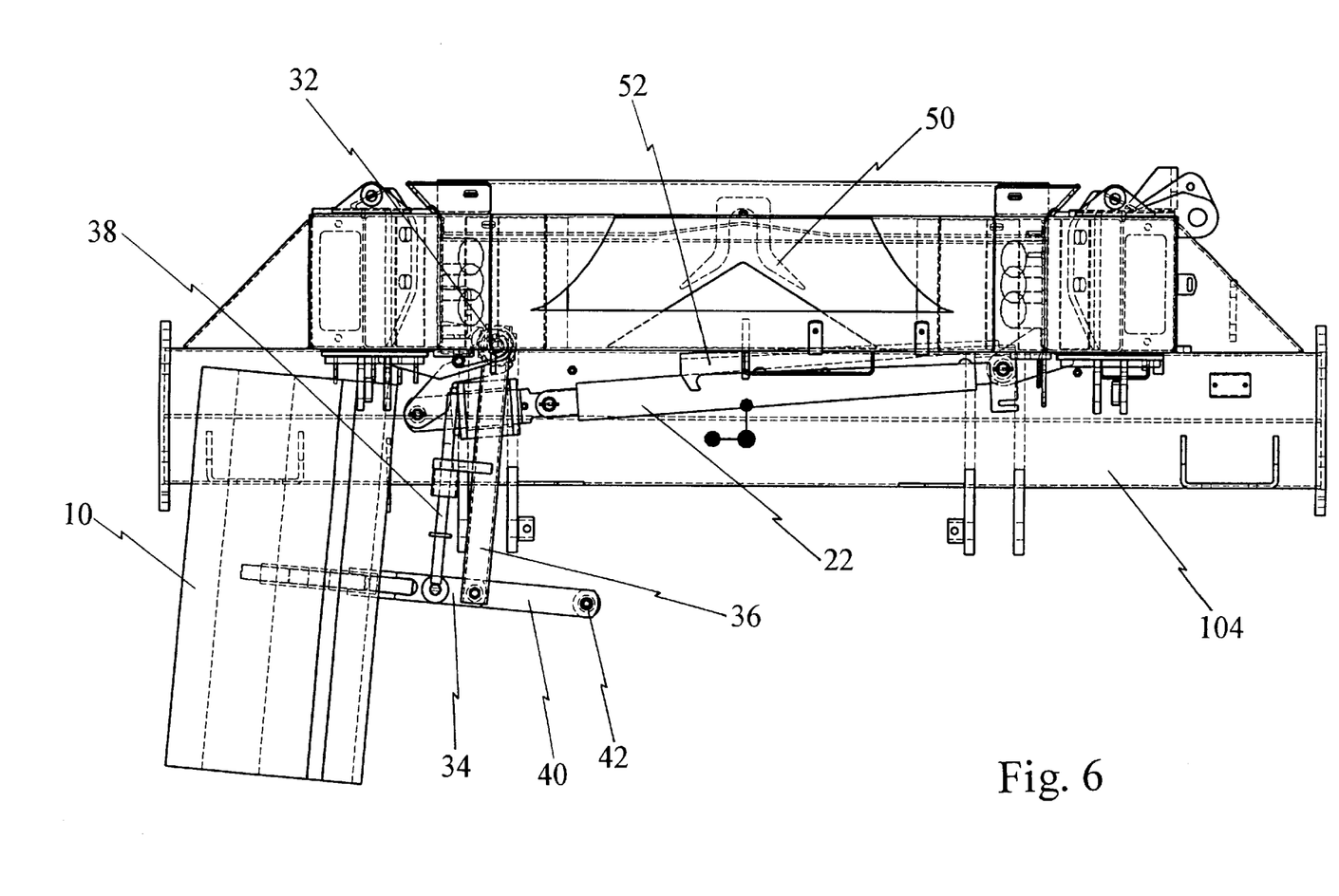
FIG. 6 is an end view of the frame and linkage members of the embodiment of FIG. 5, illustrating the manifold in a lowered position.
Figure 7:
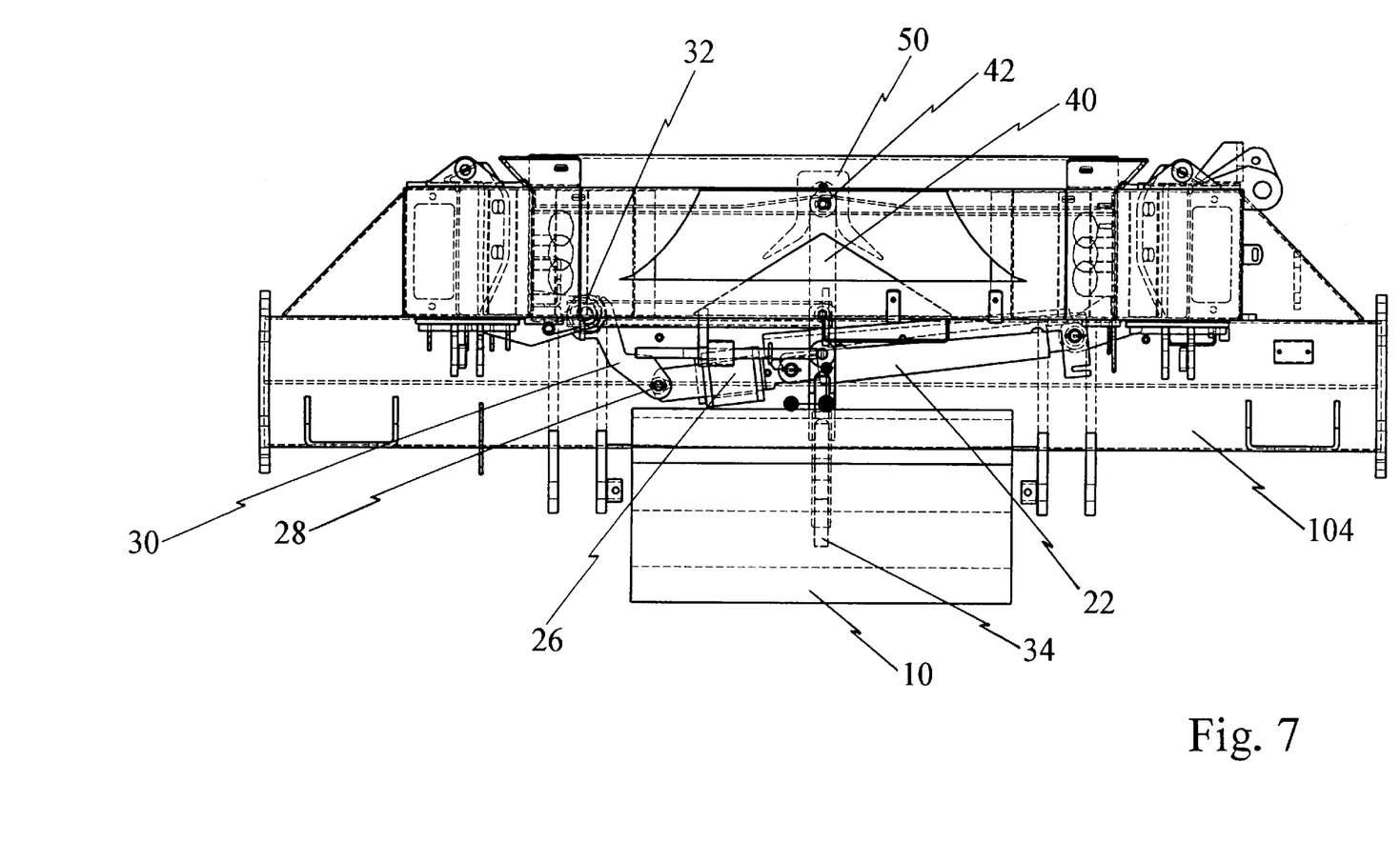
FIG. 7 is an end view as illustrated in FIG. 6, illustrating the manifold in an operational position; and, FIG. 8 is a side view of the lock mechanism of the lift linkage of the embodiment of FIG. 3 in a locked position. Like numerals are used throughout to designate like elements.

An extension 40 which carries a roller bearing 42 extends upward from one of the lift straps 34, in the operational position. Seen in FIGS. 6 and 7, the roller bearing 42 is engaged by position guide 50, centered in the air cart undercarriage, which has a vertical passage for entraining the roller bearing 42. This position guide 50 cooperates with the two point linkage of the lift arms 36 in maintaining the horizontal position of the manifold 10, enabling the downward disengaging motion prior to pivoting the manifold 10 about the support rod 32. Springs in the control rods 38 further serve to bias the manifold 10 toward a substantially horizontal position to assure that bearing 42 meets with guide 50 for proper alignment in an engaging operation. This is particularly necessary if the air cart 100 is not level when the operation occurs.

Figure 8:
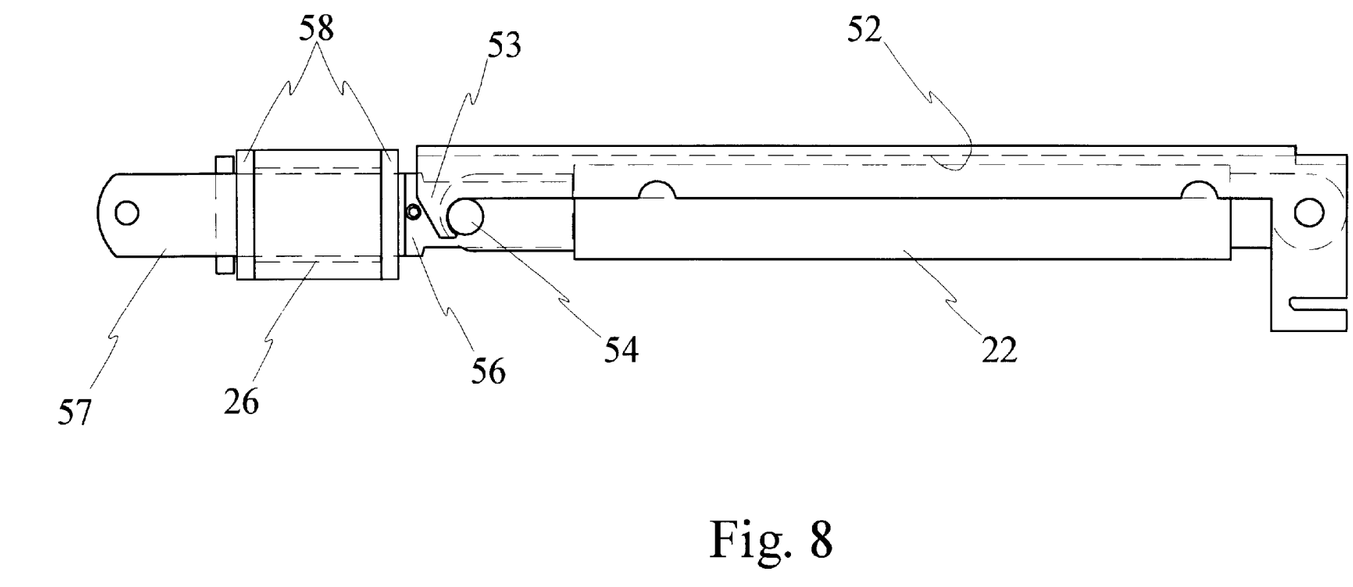

A gravity lock 52, shown alone in FIG. 8, is pivotally mounted with cylinder 22 at pin 24 to the frame 104. The lock 52 has a hook 53 for engaging lock pin 54 on the cylinder 22 when cylinder 22 is fully retracted in the operational position. A pair of telescopic members 56, 57 between cylinder 22 and linkage arm 30 include abutment faces 58 which engage and compress a spring 26 between them. An end of the first telescopic member 56 passes through member 57 and is secured by lock pin 54 to the cylinder 22. Member 57 passes through spring 26 and is secured to linkage arm 30 permitting telescopic movement between members 56 and 57 until the spring 26 is fully compressed. The spring 26 prevents the cylinder 22 from exerting excessive force on the manifold 10 against the meter outlets as it is finally positioned. The lock 52 only engages lock pin 54 once the spring 26 has been partially compressed. The tension in the spring 26 secures the lock 52 in position and maintains the sealing contact of the manifold 10 once the cylinder 22 has been depressurized. Without this spring tension it would be necessary to maintain hydraulic power to the cylinder throughout operation to maintain the sealing contact of the manifold 10 in the operational position.

In operation, to lower the manifold 10 to a service position from an operational position, first an intermediate manifold 60 is disengaged horizontally, by a manual lever, from manifold 10 at its horizontal connection at the discharge end 18. This disengagement permits the manifold 10 to be lowered as a unit without disconnecting numerous individual hose connections leading to the delivery tool. To prevent engagement of the lift mechanism 20 before the intermediate manifold 60 is disengaged, the manual lever operating the intermediate manifold 60 opens a valve establishing hydraulic power to the lift mechanism 20. Hydraulic drive to the cylinder 22 first retracts the cylinder 22 sufficiently compress the spring 26 to disengage lock 52 from the lock pin 54. A manual lever 62 conveniently lifts the lock 52 before opening a hydraulic valve to actuate the cylinder 22 to extend. Lever 62 is positioned to a first position retracting the cylinder 22 to relax the spring tension on the lock 52. In a second position the lever 62 lifts the lock 52 from lock pin 54. In a third position lever 62 opens the valve to actuate the cylinder 22. When the cylinder 22 is extended, link arm 30 is pivoted to rotate rod 32 and pivot lift arm 36. Roller bearing 42 is lowered in the vertical entraining passage of the position guide 50 causing the manifold 10 to move downward without pivoting from its substantially horizontal position. When the roller bearing 42 leaves the position guide 50, control rods 38 reach a fully extended position causing the manifold 10 to pivot about the support rod 32. Positive drive from the cylinder 22 actuates a controlled movement of the manifold 10. Any shock, such as a sudden stop, is absorbed by the springs of the control rods 38.

To replace the manifold 10 again for operation, the cylinder 22 is retracted lifting the manifold 10 to a nearly horizontal position balanced on the lift straps 34. Roller bearing 42 is directed by flared surfaces of the position guide 50 into the vertical entraining passage. Final retraction of the cylinder 22 causes the manifold 10 to lift in a substantially vertical motion to facilitate proper air tight engagement of the manifold 10 with the meter outlets. Final positioning is made by vertical fine guides comprising tapered pins in the meter outlets for mating in holes in the contact surface 16 of the manifold 10. Before the cylinder 22 reaches a fully retracted position, the manifold connection is made. Spring 26 absorbs further retraction preventing damage to the manifold 10. The spring 26 permits the cylinder 22 to retract sufficiently to engage the hook 53 of the lock 52 on lock pin 54 which is positioned by gravity as the angled edge of the hook 53 passes over the pin 54. Tension in the spring 26 forces the pin 54 against the lock 52 to hold the lift mechanism 20 securely in position for operation once the cylinder 22 is depressurized. The intermediate manifold 60 is returned to position horizontally by the manual lever engaging the discharge end 18 of the manifold. Fine guides comprising tapered pins at the end of the manifold 10, provide final alignment as the manifold 10 is engaged in position. Fine adjustment to the sealing engagement of the manifold 10 can be made by adjusting the length of one or both lift straps 34. Numerous alternative embodiments will be apparent to persons of skill in the art without departing form the spirit and scope of the invention as defined in the claims attached.

What is claimed is:

1. An automated lift for use in a pneumatic system of an air cart for moving a manifold between an operational position and a service position comprising:

actuator means for effecting displacement between the manifold and the air cart; and, pivotal support means for securing the manifold to the air cart for pivotal movement controlled by the actuator means for raising and lowering the manifold to engage and disengage sealing contact with the pneumatic system, the pivotal support means including a first pivotal linkage and a second pivotal linkage to support the manifold in a substantially horizontal position for engaging and disengaging the manifold to the pneumatic system, the second pivotal linkage including a stop means for limiting relative pivotal movement, whereby further rotation of the first pivotal linkage by the actuator means is adapted to shift the position of the manifold laterally.

2. An automated lift as defined in claim 1, further including guide means cooperating with the actuator means to direct movement of the manifold for engaging and disengaging the manifold to the pneumatic system.

3. An automated lift as defined in claim 2, wherein the guide means comprises a vertical entraining passage on the cart for receiving a follower secured to the manifold, for guiding movement of the manifold in a substantially vertical direction for disengaging and re-engaging the manifold to the pneumatic system.

4. An automated lift as defined in claim 1, wherein the actuator means comprises a linear actuator means.

5. An automated lift as defined in claim 4, wherein the actuator means comprises a hydraulic cylinder.

6. An automated lift as defined in claim 1, further including automated locking means for maintaining the manifold in an operational position.

7. An automated lift as defined in claim 5, further including an automated locking means for maintaining the manifold in an operational position once the hydraulic cylinder is depressurized.

8. An automated lift as defined in claim 7, wherein the hydraulic cylinder is connected under tension to the pivotal support means.

9. An automated lift as defined in claim 8, wherein the tension maintains the locking means in locking engagement for maintaining sealing contact of the manifold in the operational position.

10. An automated lift as defined in claim 9, wherein the locking means comprises a lever associated with the hydraulic cylinder having a pawl for engaging a locking pin mounted on a spring biased linkage between the cylinder and the pivotal support means.

11. An automated lift as defined in claim 10, further including a valve means for controlling a hydraulic connection to the cylinder, and a manual lever for operating the valve means having a first position for partially retracting the cylinder against the bias of the spring linkage, having a second position for disengaging the locking means from the locking pin when the cylinder is partially retracted, and having a third position for extending the cylinder.

12. An automated lift as defined in claim 11, wherein the lever automatically engages by gravity during retracting actuating of the cylinder.

13. A pneumatic system in an air cart for delivering material entrained in a pressurized air stream from at least one meter to a delivery tool comprising:

a manifold comprising a unitary assembly of conduits having an input for sealing contact with a meter and an output for sealing contact to a delivery tool connecting means;

pivotal support means for securing the manifold to the air cart in a first operational position and in a second service position;

actuator means for pivotally moving the manifold between the operational position and the service position.

14. A pneumatic system as defined in claim 12, wherein the pivotal support means includes a first pivotal connection means secured to the air cart and a second pivotal connection means linked to the first pivotal connection means secured to the manifold.

15. A pneumatic system as defined in claim 14, further including guide means cooperating between the air cart and the manifold to direct the manifold in seal engaging and disengaging motion.

16. A pneumatic system as defined in claim 15, further including means for laterally shifting the manifold once disengaged between the operational position and the service position.

17. A pneumatic system as defined in claim 16, further including automated locking means for releasably securing the manifold in an operational position.

18. A lock for a hydraulic cylinder having a base portion and an actuating end, the actuating end moveable by hydraulic drive between a retracted position to an extended position, said lock comprising:

extendable linkage means mounted to the actuating end for exerting a force opposite a retracting hydraulic drive force on the actuating end in the retracted position;

the extendable linkage means including a pair of telescopic linkage elements with a spring compressibly engaged between them, a lock pin on the actuating end;

an engaging means for connecting the base portion to the lock pin on the actuating end in the retracted position, whereby the force exerted by the extendable linkage means forces the lock pin in locking engagement with the engaging means.

19. A lock as defined in claim 18, wherein the engaging means comprises a rigid connecting arm pivotally mounted to the base portion and including a pawl for engaging the lock pin on the actuating end.

20. A lock as defined in claim 19 further including a valve means for controlling a hydraulic connection to the cylinder, and a lever for operating the valve means having a first position for partially retracting the actuating end against the force of the extendable linkage means, having a second position for disengaging the engaging means from the lock pin when the cylinder is partially retracted, and having a third position for extending the actuating end of the cylinder.

* * * * *